Figure 4:
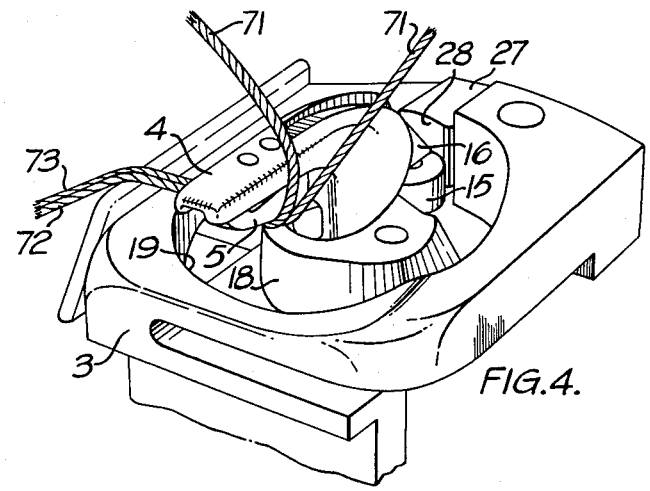
Figure 5:
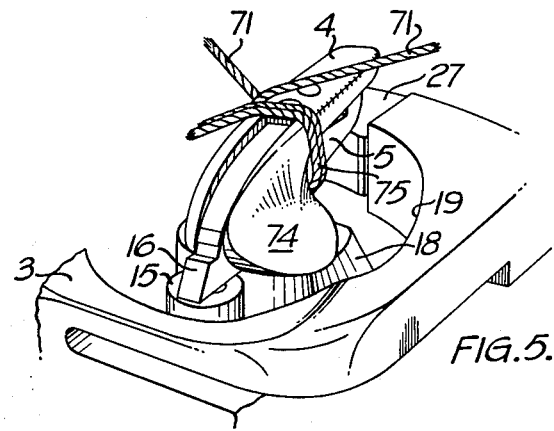
Figure 6:
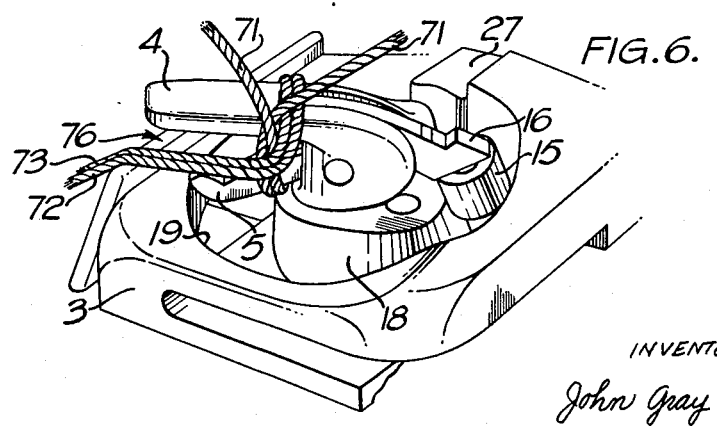
Figure 7:
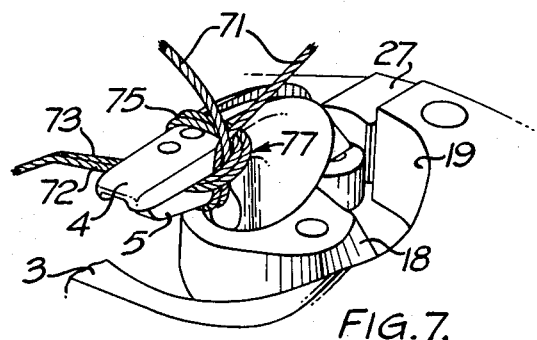

Oct. 17, 1961    J. G. WALTERS    3,004,787
KNOTTER MECHANISM FOR BUNDLE TYING MACHINES
Filed April 29, 1960    4 Sheets-Sheet 1
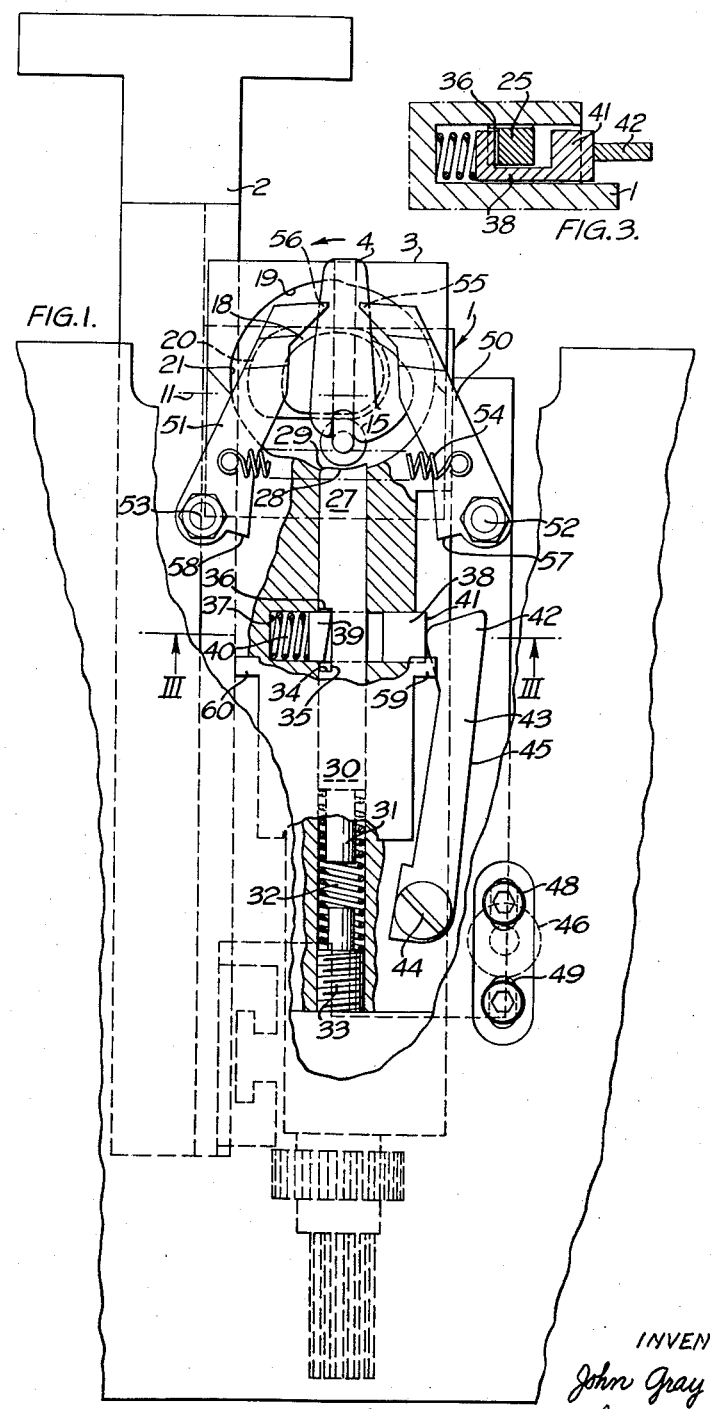
INVENTOR
John Gray Walters
BY Baldwin & Wight
ATTORNEYS

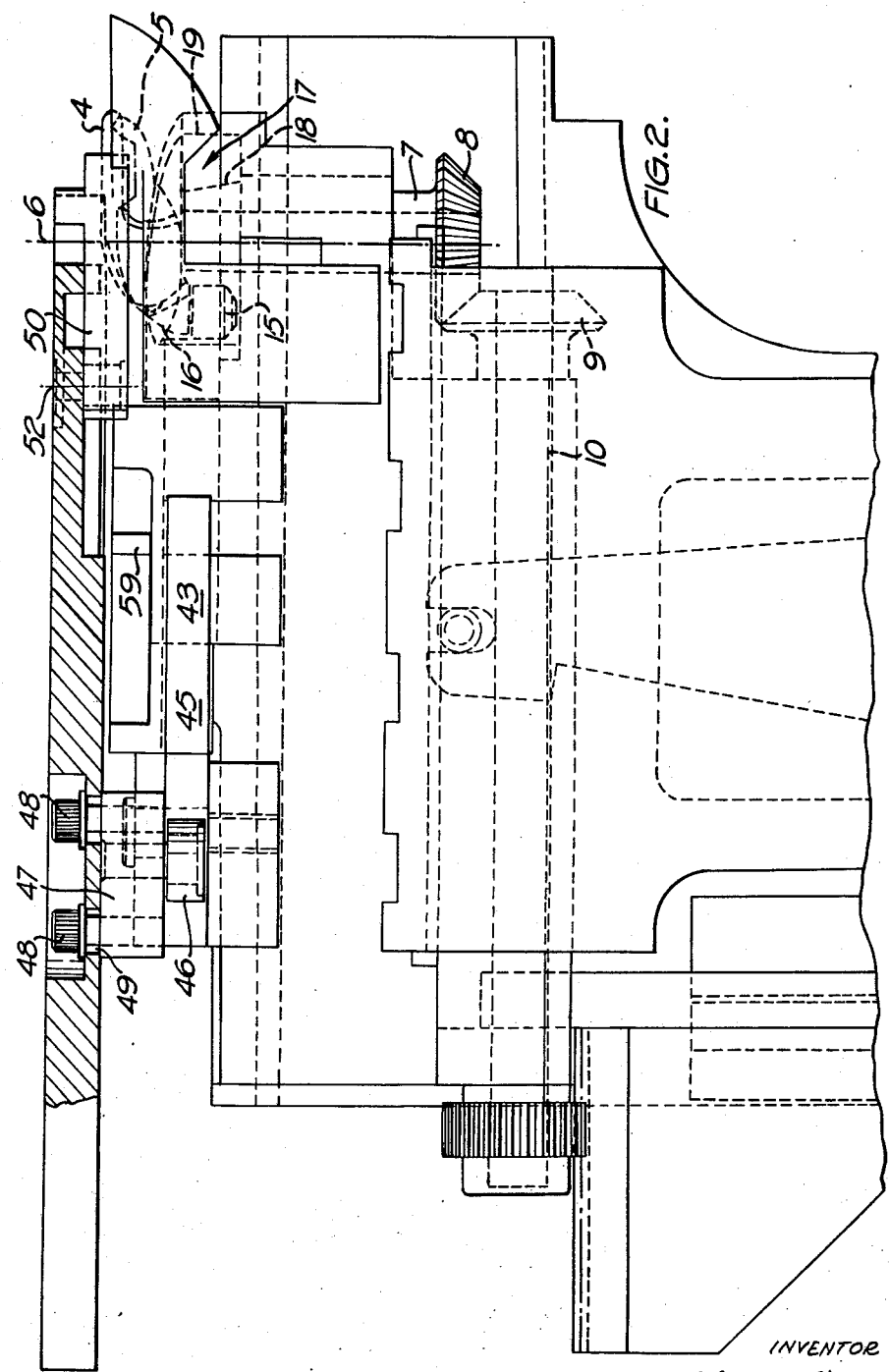

Oct. 17, 1961     J. G. WALTERS     3,004,787
KNOTTER MECHANISM FOR BUNDLE TYING MACHINES
Filed April 29, 1960     4 Sheets-Sheet 4

INVENTOR
John Gray Walters
BY Baldwin & Wight
ATTORNEYS

United States Patent Office 3,004,787
Patented Oct. 17, 1961

3,004,787
KNOTTER MECHANISM FOR BUNDLE TYING MACHINES
John Gray Walters, Sevenoaks, England, assignor to The Sheridan Service Company Limited, London, England, a company of Great Britain
Filed Apr. 29, 1960, Ser. No. 25,650
Claims priority, application Great Britain Jan. 29, 1960
8 Claims. (Cl. 289—11)

This invention relates to a knotter mechanism for use in a bundle tying machine which wraps twine or string around a bundle and then ties and severs said twine or string. The wrapping and tying operations are generally performed in one continuous operation.

In a known construction of knotter mechanism there is provided a pair of co-operating jaws rotatable about a common axis, one of the jaws also being tiltable about an axis normal to said common axis to facilitate opening and closing of the jaws. The tilting of one of the jaws is effected by cam means and spring biassing means is provided to hold the tiltable jaw in its closed position. The pressure of the spring bias must be great enough to effect closing of the jaws, but not so great as to prevent the tied twine or string from being stripped out of the jaws. This arrangement of spring biassing means has certain disadvantages, particularly when a heavy twine, e.g. sisal, is used; for example, it is less critical so far as the knotter release point is concerned.

The present invention seeks to provide a knotter mechanism having improved means for locking the jaws in a closed position. It is also an object of the invention to provide a knotter mechanism having improved cam means for fully controlling opening and closing the jaws of said mechanism.

According to the present invention a knotter mechanism, suitable for use in a bundle tying machine, includes a pair of co-operating jaws mounted in a carriage for rotation about a common axis, one of said jaws being tiltable about an axis normal to said common axis to effect opening and closing of the jaws, a cam follower carried by the tiltable jaw and adapted to engage with cam means during rotation of the jaws about their common axis, and a slidable member adapted to co-operate with the cam follower when the jaws are in a closed position, thereby releasably to lock the jaws closed.

Preferably the slidable member comprises a plunger and releasable means may be provided to lock the plunger in a position to maintain the jaws closed.

The carriage may be mounted in a support frame for sliding movement between a rearward inoperative position and a forward operative position, the plunger locking means being adapted to be rendered inoperative when the carriage is in its rearward position.

The jaws may be rotatable about a common vertical axis and the lower jaw may be tiltable and may carry a cam follower. Preferably the plunger is mounted in the carriage for sliding movement normal to the common axis of the jaws, and spring means may be provided to bias said plunger into a forward operative position in engagement with the cam follower. Abutments may be provided to limit forward movement of the plunger to ensure that a head thereof is in a correct position for engagement with the cam follower.

The plunger locking means may comprise a latch piece mounted in the carriage for sliding movement normal to the direction of sliding movement of the plunger, said latch having a nose arranged for engagement with an abutment on the plunger. Spring means may be provided to bias the latch piece into engagement with the plunger and when the latch piece is in this position the plunger is locked against movement in a direction to allow the jaws to open. A release lever, pivotally attached to the carriage, may be provided to move the latch piece out of engagement with the plunger, a projection on said lever, remote from the point of pivotal attachment thereof, bearing against said latch piece. The release lever may be provided with a cam surface positioned to strike a fixed abutment on the support frame when the carriage moves to its rearward position whereby said release lever is moved to push the latch piece out of engagement with the plunger. Alternatively, an end of the latch piece, projecting from the carriage may be arranged to strike a fixed abutment on the support frame, when the carriage moves to its rearward position, whereby the latch piece is moved out of engagement with the plunger.

In a known construction of knotter mechanism the cam follower may comprise a roller carried by an extension of the lower jaw and arranged to bear against a fixed cam surface below said jaw. The cam surface may have a nose so that, as the jaws rotate about their common axis and the cam follower rides over the nose, the lower jaw is pushed into an open position. With this arrangement the cam surface serves only to move the cam follower radially outwardly with respect to the common axis of the jaws and there is a tendency for the cam follower, during rotation of the jaws, to fly outwardly due to centrifugal force resulting in premature opening of said jaws.

According to the invention this is overcome by providing a cam track, defined by spaced inner and outer cam surfaces, along which the cam follower moves during rotation of the jaws.

An embodiment of the invention is illustrated in accompanying drawings in which:
FIGURE 1 is a plan view, with parts broken away, of a knotter mechanism,
FIGURE 2 is a side elevation,
FIGURE 3 is a section of part of the knotter mechanism along the line III—III in FIGURE 1, and
FIGURES 4, 5, 6, 7 and 8 are perspective views of the knotter jaws showing the sequence of knot formation.

The knotter mechanism illustrated in the accompanying drawings is shown mounted in a support frame of a bundle tying machine similar to that which is described and illustrated in British patent specification No. 820,866.

Referring to the accompanying drawings, a carriage 1 is slidably mounted in a fixed support frame 2. In FIGURE 1 the carriage 1 is shown in a position intermediate a forward operative position and a rearward inoperative position. At the front end 3 of the carriage a pair of knotter jaws 4, 5 are mounted for rotation about a common vertical axis 6. The jaws 4, 5 are attached to a shaft 7 which passes through the carriage 1 and carries, at its lower end, a bevel gear 8. This gear 8 meshes with a bevel gear 9 fast on a drive shaft 10 which is driven by suitable drive means (not shown). The lower jaw 5 is mounted on the shaft 7 for tilting movement about an axis 11 which is normal to the common axis 6 whereby the jaws 4, 5 may be caused to open and close. A cam follower 15, in the form of a roller is mounted on an extension 16 of the lower jaw 5 and rides in a cam track 17 defined by an inner cam surface 18 and an outer cam surface 19. These cam surfaces are fixed with respect to the jaws 4, 5 and are carried by the carriage 1. The inner cam surface 18 is formed with a nose 20, and the outer cam surface 19 is formed with a corresponding recess 21 so that, as the jaws rotate about their common axis 6 and the cam follower 15 moves around the cam track 17, the lower jaw 5 is caused to tilt to an open position when the cam follower 15 moves over the nose 20. The jaws 4, 5 rotate through one complete revolution during each knotting operation. They start and finish in a closed position and do not commence to open until they have rotated through approximately 180°.

A plunger 25 is slidably mounted in a bore 26 extending longitudinally through the carriage 1. The bore 26 at a forward end opens into the cam track 17 and a head 27 of the plunger forms a continuation of the outer cam surface 19. The operative surface of the head 27 is notched, as indicated at 28, and forms a continuation of the cam surface 19, said head, at one edge, also is chamfered as indicated at 29.

The plunger 25 at a rearward end 30 is formed with an extension 31 of reduced diameter and a compression coil spring 32 fits over this. The plunger 25 does not extend the full length of the bore 26 and the rearward end of the bore is closed by a plug or screw 33 which threadedly engages therewith. The coil spring 32 bears against the inner end of the screw 33 and hence is maintained under compression so as to bias the plunger 25 in a forward direction. Forward movement of the plunger 25 is limited by an abutment 34 so that when in its forward position the operative surface 28 of the head 27 forms a continuation of the outer cam surface 19.

The plunger 25 is formed with a recess 35 which at each end provides an abutment 36. This recess 35 is in alignment with a second bore 37 extending transversely through the carriage 1. A latch piece 38 (see FIGURE 3), of generally U-shape in section, is slidably mounted in said bore 37 and is provided with a nose 39 for engagement with the abutment surfaces 36. A compression coil spring 40 is housed in the bore 37 and biasses the latch piece 38 to the right, as shown in FIGURE 1, so that the nose 39 lies within the recess 35 which has a length slightly greater than the width of said nose. When the latch piece 38 is in this position the plunger 25 is locked against sliding movement in a rearward direction so that the operative surface 28 of the head 27 is maintained in a position wherein said surface 28 forms a continuation of the outer cam surface 19. Furthermore, sliding movement of the plunger in a forward direction under the bias of the spring 32 is limited by engagement of the abutment 34 with the nose 39. An end 41 of the latch piece 38 protrudes through the side of the carriage 1 and engages with a projection 42 of a release lever 43 which is pivotally attached at 44 to the carriage 41. Said release lever is provided with a cam surface 45 along one of its edges.

As previously mentioned the carriage 1 is mounted on the fixed support frame 2 for sliding movement between a forward operative position and a rearward inoperative position. As the carriage moves back to its rearward position the cam surface 45 of the release lever 43 strikes a fixed abutment 46. The abutment 46 is in the form of a roller rotatably mounted on a block 47 having bolts 48, which pass through slots 49 in the support frame 2. The relative position of the roller 46 can thereby be adjusted to control the timing of the unlocking of the plunger 25. As the release lever 45 strikes the roller 46 it pivots inwardly so that the projection 42 pushes the latch piece 38 to the left, as seen in FIGURES 1 and 3, against the bias of the spring 40, thereby moving the nose 39 out of the recess 35. The plunger is thus unlocked and is only held against sliding movement in a rearward direction by the bias of the coil spring 32. Thus, when the twine is stripped from the jaws 4, 5 the lower jaw 5 can tilt open against the bias of said spring 32.

Stripping of the twine from the jaws 4 and 5 is performed by a pair of stripper fingers 50, 51 pivotally attached respectively at 52, 53 to the support frame 2. A tension coil spring 54 is attached between the fingers 50, 51 so as to pull them together and bring their heads 55, 56 into engagement with the jaws 4, 5. This positioning of the fingers 50, 51 is shown in FIGURE 1. Each finger 50, 51 respectively is provided with an abutment 57, 58 arranged to engage with ears 59, 60, mounted on the carriage 1, as said carriage moves into its forward position.

With this arrangement, when the carriage is in its forward position, the abutment surface 57, 58 of the fingers 50, 51 are engaged by the ears 59, 60, so that said fingers are held apart out of the way of the jaws 4, 5. As the carriage 1 moves rearwardly, from its operative to its inoperative position, the ears 59, 60 also move rearwardly thereby allowing the fingers 50, 51 to move towards each other into engagement with the sides of the jaws 4, 5, so that the twine wrapped around the jaws is stripped therefrom and a knot completed.

The knotter jaws 4, 5 operate in known manner and during the knotting operation, said jaws rotate about their common axis 6 through 360°. The knotting operation is performed when the carriage 1 is in its forward operative position with the plunger 25 locked against rearward sliding movement. Upon completion of the rotation of the knotter jaws, the cam follower 15 is engaged by the head 27 of the plunger 25, and the lower jaw 5, is held closed.

The relative position of the knotter jaws 4, 5 and twine 70, after said twine has been wrapped around a bundle, is shown in FIGURE 4. The loop of twine around the bundle is not shown but 71 indicates the direction of the twine coming down from the loop and under the lower jaw 5. The severed end length 72 of twine is held firmly by the means which has wrapped the twine 70 into a loop or wrap around the bundle and said means also has, at this stage, engaged to hold firmly the length 73 of twine extending back to the twine supply; the length 73 will be severed after a knot has been tied. The manner in which the loop of twine is formed around the bundle and the lengths 72, 73 anchored during the tying operation is acknowledged as being known.

To form a knot the knotter jaws 4, 5 are rotated through a complete revolution about this common axis 6 and when they have turned through approximately 180° the cam follower 15 starts to ride over the nose 20, thereby causing the lower jaw 5 to open. During the rotation of the jaws through the first 180° a shoulder 74 of the upper jaw 4 slides under the lengths 72, 73 of twine lifting them up on top of said upper jaw and forming a double loop 75 around the jaws 4, 5; see FIGURE 5. The formation of the loop 75 tends to pull the twine 71 which is wrapped around the bundle tight because the lengths 72, 73 of twine are firmly anchored.

The lower jaw 5 fully opens as the cam follower 15 reaches the maximum rise of the nose 20. This occurs after the jaws have rotated through approximately 270° and the opening 76 between the jaws is in alignment with the anchored lengths 72, 73 of twine. During the final stage of rotation of the jaws 4, 5, the cam follower 15 moves off the nose 20 causing the lower jaw 5 to snap shut, thereby clamping the lengths 72, 73 of twine, which lengths have been doubled back upon themselves, as indicated at 79, about the double loop 75 of twine around the jaws 4, 5.

To complete the tying of the knot all that is necessary is to strip the double loop 75 of twine off the jaws 4, 5 and over the clamped lengths 72, 73. It is this stripping operation that determines how tight the knot is pulled. As previously mentioned, upon completion of the rotation of the knotter jaws 4, 5 the cam follower 15 is engaged by the head 27 of the plunger 25 and the lower jaw 5 is positively held closed.

Figure 8:
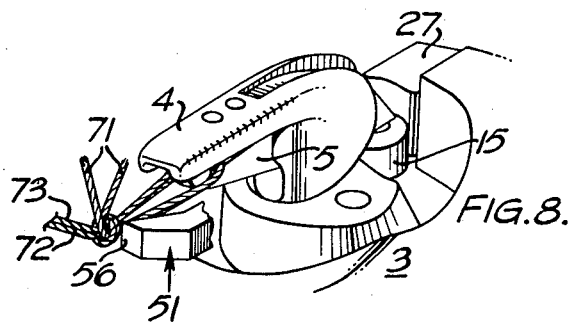

During the stripping operation the carriage 1 moves rearwardly to its inoperative position and simultaneously the stripper fingers 50, 51 move together into engagement with the sides of the jaws 4, 5, as seen in FIGURE 8 and behind the double loop 75 of twine around the jaws. Continued rearward movement of the carriage causes the clamped lengths 72, 73 of twine between the jaws 4, 5 to be pulled through the double loop 75 which is held relatively stationary and slides off the jaws. Even after the double loop 75 has moved off the jaws it is still held stationary by the fingers 50, 51 so that the knot formed is pulled very tight. Not until this has been done does the cam surface 45 of the release lever 43 strike the roller 46. When this occurs, the release lever 43 pivots and pushes the latch piece 38 out of engagement with the plunger 25. The plunger is thus unlocked so that the twine lying between the jaws 4, 5 can be pulled therefrom. This occurs just before or simultaneously as the carriage 1 reaches its rearward inoperative position. When the carriage moves to its forward operative position the foregoing sequence of events, so far as the actuation of the knotter mechanism and its ancillary parts are concerned, occur in reverse.

To form a very tight knot it is important that the knotter jaws 4, 5 firmly clamp the lengths 72, 73 of twine until just before or simultaneously as the carriage 1 reaches its rearward inoperative position. The present invention provides a mechanism, not previously proposed or known, positively to lock the jaws in this clamping position.

As the knotter jaws 4, 5 complete their revolution to twist the sisal or twine into a knot, the cam follower 15 engages with the head 27 of the plunger 25 and snaps into the notch 28. This notch thus serves to centralize the knotter jaws after each revolution, thereby ensuring that they always return to precisely the same angular position which is important so far as the transmission to rotate said jaws is concerned. The fact that the width of the nose 39 is less than the length of the recess 35 allows the plunger limited movement in a rearward direction to permit the cam follower 15 to ride over the chamfered edge 29. When the carriage 3 moves initially rearwardly from its forward position the jaws are locked closed and thus hold firmly onto the twine wrapped around a bundle and pull it tight. Next the stripper fingers push the loop of twine off the closed jaws and relatively towards the bundle thereby forming a taut wrap of twine around the bundle and a tight knot. Only when this has been done is the plunger released to permit the jaws to open and release the twine. The timing of this can be controlled very precisely by adjustment of the position of the roller 46.

During rotation of the jaws 4, 5 the cam follower 15 is prevented from flying radially outwardly due to centrifugal force, with respect to the common axis 6, by the outer cam surface 19 and hence premature opening of the jaws is prevented. Furthermore, the cam follower 15 is moved radially inwardly as it moves off the nose 20 by the outer cam surface 19 so that positive control of the closing of the jaws is obtained. The opening and closing of the jaws is fully controlled so that there is no need to provide the lower jaw with a leaf spring biasing it to its closed position.

When using sisal it is found that "fluff" is deposited in and around the knotter mechanism. There is little or no risk of such "fluff" clogging the mechanism according to the present invention because the knotter jaws and their ancillary parts are substantially free of cracks and crevices and the cam follower tends to sweep away any "fluff" which may settle in the cam track.

It is envisaged that the latch piece 38 may be acted on directly by the abutment roller 46 thereby dispensing with the release lever 43. To do this the end 41 of said latch piece would be inclined. It is also envisaged that the plunger may be replaced by a member mounted for transverse sliding movement with respect to the longitudinal axis of the carriage. Such a member would be positioned immediately behind the outer cam surface 19 and formed with a cam follower abutment surface and adjacent recess whereby in a first position, the abutment surface would be in alignment with the cam follower to lock the jaws closed and, in a second position, the recess would be in alignment with said cam follower thereby allowing the jaws to open. Sliding movement of this member could be controlled in like manner as sliding movement of the latch piece is controlled.

What is claimed is:

1. A knotter mechanism, suitable for use in a bundle tying machine, including a carriage mounted in a support frame of said tying machine for sliding movement between a rearward inoperative position and a forward operative position, a pair of co-operating knotter jaws mounted in said carriage for rotation about a common axis, one of said knotter jaws being tiltable about an axis normal to said common axis to effect opening and closing of said knotter jaws, cam means defining a cam path around said common axis of said knotter jaws, a cam follower carried by said tiltable knotter jaw and adapted to engage said cam means during rotation of said knotter jaws about their common axis, a plunger slidably mounted in said carriage and adapted to co-operate with said cam follower when said knotter jaws are in a closed position and releasable latch means to lock said plunger in a position of engagement with said cam follower thereby to maintain the jaws closed.

2. A knotter mechanism of a bundle tying machine, including a carriage mounted in a support frame of said tying machine for sliding movement between a rearward inoperative position and a forward operative position, an upper jaw and a lower jaw mounted on said carriage for rotation about a common axis, said lower jaw being tiltable about an axis normal to said common axis to effect opening and closing of the jaws, a pair of annular cam surfaces co-operating to define a cam track around said common axis, a cam follower carried by said tiltable lower jaw and adapted to engage said cam track, a plunger mounted in said carriage for sliding movement normal to said common axis of said upper and lower jaws, a head of said plunger being adapted to engage said cam follower when said knotter jaws are in a closed position, spring means to bias said plunger into a forward operative position, abutments to limit forward movement of said plunger to ensure that said head thereof is in a correct position for engagement with said cam follower and releasable latch means to lock said plunger in a position with said head thereof in a position of engagement with said cam follower, thereby to maintain said upper and lower jaws closed.

3. A knotter mechanism of a bundle tying machine, including a carriage mounted in a support frame of said tying machine for sliding movement between a rearward inoperative position and a forward operative position, a pair of co-operating knotter jaws mounted in said carriage for rotation about a common axis, one of said knotter jaws being tiltable about an axis normal to said common axis to effect opening and closing of said knotter jaws, cam means defining a cam path around said common axis of said knotter jaws, a cam follower carried by said tiltable knotter jaw and adapted to engage said cam means during rotation of said knotter jaws about their common axis, a plunger mounted in said carriage for sliding movement normal to said common axis of said jaws, spring means to bias said plunger into a forward operative position with a head of said plunger in engagement with said cam follower when said knotter jaws are in a closed position, and releasable latch means to lock said plunger in a position with said plunger head in engagement with said cam follower thereby to maintain said jaws closed.

4. A knotter mechanism according to claim 3 wherein the releasable latch means comprises a latch piece mounted in said carriage for sliding movement normal to the direction of sliding movement of said plunger, said latch piece having a nose for engagement with an abutment on said plunger.

5. A knotter mechanism according to claim 4 including spring means to bias said latch piece into engagement with said abutment on said plunger, thereby locking said plunger against movement in a rearward direction to allow said knotter jaws to open.

6. A knotter mechanism according to claim 5 including a release lever, pivotally attached to said carriage, to move said latch piece out of engagement with said abutment of said plunger, a projection on said release lever, remote from the point of pivotal attachment thereof with said carriage, bearing against said latch piece.

7. A knotter mechanism according to claim 6 including a cam surface on said release lever and a fixed abutment on the support frame of the tying machine positioned to strike said cam surface when said carriage moves to its rearward inoperative position, whereby said release lever is pivoted to push said latch piece out of engagement with said abutment of said plunger.

8. A knotter mechanism according to claim 5 wherein an end of said latch piece projects from said carriage and including a fixed abutment on the support frame of the tying machine, whereby, when said carriage moves to its rearward inoperative position, said projecting end of said latch piece strikes said fixed abutment thereby moving said latch piece out of engagement with said abutment of said plunger.

References Cited in the file of this patent

UNITED STATES PATENTS

| | | |
|---|---|---|
| 331,493 | Green | Dec. 1, 1885 |
| 2,080,149 | Parker | May 11, 1937 |
| 2,405,688 | Crumb | Aug. 13, 1946 |